United States Patent
Kim

(10) Patent No.: US 9,204,120 B2
(45) Date of Patent: Dec. 1, 2015

(54) METHOD AND APPARATUS FOR PROVIDING USER INPUT-BASED MANIPULABLE OVERLAPPING AREA DISPLAYED ON A MOVING IMAGE REPRODUCING SCREEN AND RELATED COMPUTER-READABLE STORAGE MEDIUM

(71) Applicant: SAMSUNG ELECTRONICS CO., LTD., Suwon-si, Gyeonggi-do (KR)

(72) Inventor: Hye-jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 13/707,881

(22) Filed: Dec. 7, 2012

(65) Prior Publication Data
US 2013/0156396 A1    Jun. 20, 2013

(30) Foreign Application Priority Data

Dec. 16, 2011  (KR) .......................... 10-2011-0136559

(51) Int. Cl.
*H04N 9/80* (2006.01)
*H04N 9/87* (2006.01)
*H04N 1/32* (2006.01)

(52) U.S. Cl.
CPC .............. *H04N 9/87* (2013.01); *H04N 1/32112* (2013.01); *H04N 2201/3247* (2013.01); *H04N 2201/3249* (2013.01); *H04N 2201/3253* (2013.01); *H04N 2201/3266* (2013.01); *H04N 2201/3267* (2013.01); *H04N 2201/3273* (2013.01); *H04N 2201/3274* (2013.01)

(58) Field of Classification Search
None
See application file for complete search history.

(56) References Cited

U.S. PATENT DOCUMENTS

| 8,289,345 | B2 * | 10/2012 | Muikaichi et al. ............ 345/629 |
| 2003/0051228 | A1 * | 3/2003 | Martinez et al. .............. 717/109 |
| 2006/0129519 | A1 * | 6/2006 | Sera et al. ......................... 707/1 |
| 2007/0294242 | A1 * | 12/2007 | Watanabe et al. ................. 707/5 |
| 2010/0007792 | A1 * | 1/2010 | Kim et al. ..................... 348/569 |
| 2010/0020188 | A1 * | 1/2010 | Yamaguchi ................ 348/220.1 |

* cited by examiner

*Primary Examiner* — William C Vaughn, Jr.
*Assistant Examiner* — Daniel Tekle
(74) *Attorney, Agent, or Firm* — Drinker Biddle & Reath LLP

(57) ABSTRACT

A method and apparatus are provided for reproducing a moving image that may improve user convenience by providing information regarding the moving image to enable a user to conveniently and easily manipulate the apparatus. An image reproducing apparatus includes: a moving image reproducing unit for reproducing a moving image; and an overlapping area providing unit for displaying related information regarding the moving image on one or more overlapping areas displayed on a moving image reproducing screen, wherein the one or more overlapping areas are movable and manipulable by a user's input.

19 Claims, 9 Drawing Sheets

METHOD AND APPARATUS FOR PROVIDING USER INPUT-BASED MANIPULABLE OVERLAPPING AREA DISPLAYED ON A MOVING IMAGE REPRODUCING SCREEN AND RELATED COMPUTER-READABLE STORAGE MEDIUM

CROSS-REFERENCE TO RELATED PATENT APPLICATION

This application claims the benefit of Korean Patent Application No. 10-2011-0136559, filed on Dec. 16, 2011, in the Korean Intellectual Property Office, the disclosure of which is incorporated herein in its entirety by reference.

BACKGROUND

Disclosed herein are a method and apparatus for reproducing an image, and a computer-readable storage medium that stores a computer program code for executing the method.

As performances of photographing apparatuses have been improved, various photographing apparatuses may photograph and store not only a still image but also a moving image. Also, photographing apparatuses provide various functions, for example, inputting of a memo regarding an image or storing of geographical information.

SUMMARY

Embodiments of the invention provide a method and apparatus for reproducing a moving image that may improve user convenience by providing information regarding the moving image to enable a user to conveniently and easily manipulate the apparatus.

Embodiments of the invention also provide a method and apparatus for reproducing a moving image that may dynamically provide information regarding a moving image in conjunction with a reproducing time of the moving image to effectively provide the information regarding the moving image to a user.

According to an embodiment of the invention, there is provided an image reproducing apparatus including: a moving image reproducing unit for reproducing a moving image; and an overlapping area providing unit for displaying related information regarding the moving image on one or more overlapping areas displayed on a moving image reproducing screen, wherein the one or more overlapping areas are movable and manipulable by a user's input.

The overlapping area providing unit may search for the related information of a type designated by a user and provides the related information to the overlapping area.

The related information may be one or more related still images captured during capturing of the moving image, and a still image to be displayed on the overlapping area is able to be selected from among the one or more related still images according to a user's input.

A reproducing time of the moving image may be in conjunction with a photographing time of each of the one or more related still images, and thus the one or more related still images reproduced on the overlapping area are changed.

The related information may be geographical information recorded during capturing of the moving image, and the geographical information displayed on the overlapping area in conjunction with the reproducing time of the moving image may be changed.

The related information may be a memo recorded during capturing of the moving image, and the memo displayed on the overlapping area may be changed by the reproducing time of the moving image and a recording time of the memo that are in conjunction with each other.

According to another embodiment of the invention, there is provided an image reproducing method including: reproducing a moving image; and displaying related information regarding the moving image on one or more overlapping areas displayed on a moving image reproducing screen, wherein the one or more overlapping areas are movable and manipulable by a user's input.

The image reproducing method may further include searching for the related information of a type designated by a user and providing the related information to the overlapping area.

The related information may be one or more related still images captured during capturing of the moving image, and a still image to be displayed on the overlapping area may be selectable from among the one or more related still images according to a user's input.

A reproducing time of the moving image may be in conjunction with a photographing time of each of the one or more related still images, and thus the one or more related still images reproduced on the overlapping area may be changed.

The related information may be geographical information recorded during capturing of the moving image, and the geographical information displayed on the overlapping area in conjunction with the reproducing time of the moving image may be changed.

The related information may be a memo recorded during capturing of the moving image, and the memo displayed on the overlapping area is changed by the reproducing time of the moving image and a recording time of the memo that may be in conjunction with each other.

According to another embodiment of the invention, there is provided a non-transitory computer-readable storage medium for storing a computer program code for executing an image reproducing method when being executed by a processor, the image reproducing method including: reproducing a moving image; and displaying related information regarding the moving image on one or more overlapping areas displayed on a moving image reproducing screen, wherein the one or more overlapping areas are movable and manipulable by a user's input.

The image reproducing method may further include searching for the related information of a type designated by a user and providing the related information to the overlapping area.

The related information may be one or more related still images captured during capturing of the moving image, and a still image to be displayed on the overlapping area may be able to be selected from among the one or more related still images according to a user's input.

A reproducing time of the moving image is in conjunction with a photographing time of each of the one or more related still images, and thus the one or more related still images reproduced on the overlapping area are changed.

The related information may be geographical information recorded during capturing of the moving image, and the geographical information displayed on the overlapping area in conjunction with the reproducing time of the moving image may be changed.

The related information may be a memo recorded during capturing of the moving image, and the memo displayed on the overlapping area is changed by the reproducing time of the moving image and a recording time of the memo that may be in conjunction with each other.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The detailed description of various embodiments of the invention and the accompanying drawings are provided to understand operation according to the invention and details well-known to one of ordinary skill in the art may be omitted.

Also, the specification and drawings are not provided to limit the invention and scope of the invention may be defined by the claims. The terminology used herein should be construed as having the meaning and concept of a technical idea of the invention to fully understand the invention. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the invention will be described in detail with reference to the accompanying drawings.

An image photographing apparatus according to embodiments of the invention may be embodied in various forms such as a digital photographing apparatus, a personal computer (PC), a laptop computer (LCU), a mobile phone, or the like. In the present specification, an embodiment in which the image photographing apparatus is embodied in the form of a digital photographing apparatus is mainly described. However, the scope of the invention is defined by descriptions of claims, and the invention is not limited thereto.

Figure 1:
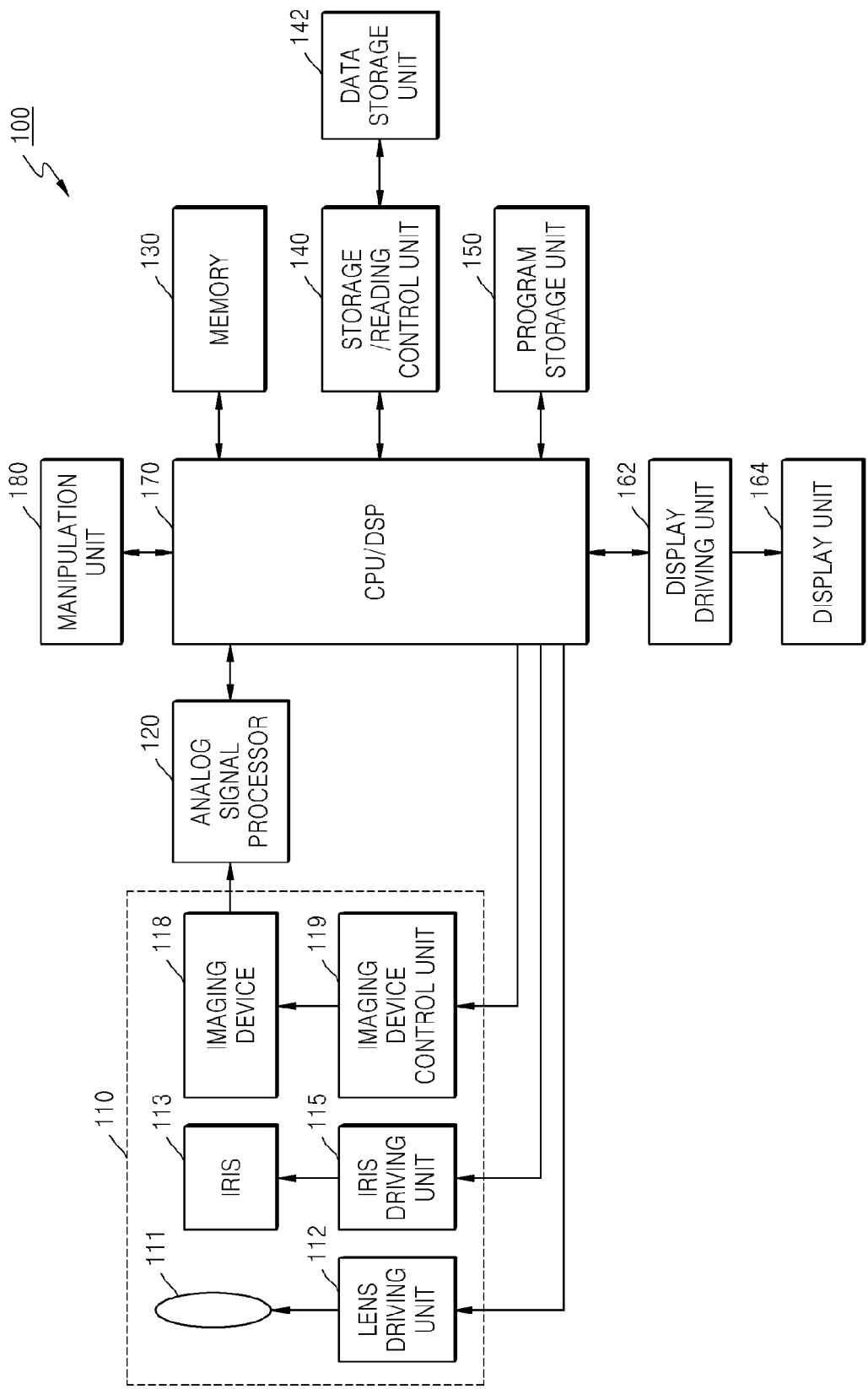
FIG. 1 is a block diagram showing a digital photographing apparatus according to an embodiment of the invention.

FIG. 1 is a block diagram showing a digital photographing apparatus 100, according to an embodiment of the invention.

The digital photographing apparatus 100 of the current embodiment may include a photographing unit 110, an analog signal processor 120, a memory 130, a storage/reading controller 140, a data storage unit 142, a program storage unit 150, a display driving unit 162, a display unit 164, a central processing unit (CPU)/digital signal processor (DSP) 170, and a manipulation unit 180.

Entire operation of the digital photographing apparatus 100 may be managed by the CPU/DSP 170. The CPU/DSP 170 provides control signals for driving a lens driving unit 112, an iris driving unit 115, and an imaging device control unit 119, respectively.

The photographing unit 110 generates an image of an electric signal from incident light and includes a lens 111, the lens driving unit 112, an iris 113, the iris driving unit 115, an imaging device 118, and the imaging device control unit 119.

The lens 111 may include a plurality of groups or pieces of lenses. A location of the lens 111 is controlled by the lens driving unit 112, according to the control signal provided from the CPU/DSP 170.

Opening and closing of the iris 113 is controlled by the iris driving unit 115, and the iris 113 controls an amount of light incident into the imaging device 118.

An optical signal that transmits through the lens 111 and the iris 113 forms an image of a subject on a light-receiving surface of the imaging device 118. The imaging device 118 may be a charge-coupled device (CCD), a complementary metal oxide semiconductor image sensor (CIS), or other type of imaging device that converts an optical signal into an electric signal. Sensitivity of the imaging device 118 may be controlled by the imaging device control unit 119. The imaging device control unit 119 may control the imaging device 118 according to a control signal automatically generated by an image signal input in real time or a control signal manually input by manipulation of a user.

Exposure time of the imaging device 118 is controlled using a shutter (not illustrated). The shutter may include a mechanical shutter that controls light incidence by moving a screen or an electric shutter that controls exposure by applying an electric signal.

The analog signal processor 120 performs a noise reduction process, gain adjusting, waveform shaping, and analog-digital conversion on an analog signal applied from the imaging device 118.

The signal processed by the analog signal processor 120 may be input to the CPU/DSP 170 through the memory 130 or may be input to the CPU/DSP 170 without passing through the memory 130. Here, the memory 130 is driven as a main memory of the digital photographing apparatus 100 and temporarily stores information for driving the CPU/DSP 170. The program storage unit 150 stores programs such as an operating system and an application system for driving the digital photographing apparatus 100.

In addition, the digital photographing apparatus 100 includes the display unit 164 to display an operation state of the digital photographing apparatus 100 or information regarding an image captured by the digital photographing apparatus 100. The display unit 164 may provide visible information and/or acoustic information to a user. In order to provide visible information, the display unit 164 may include, for example, a liquid crystal display (LCD) panel, an organic light-emitting diode (OLED) panel, or the like. Also, the display unit 164 may be a touch screen that may recognize a touch input.

The display driving unit 162 provides a driving signal to the display unit 164.

The CPU/DSP 170 processes an input image signal and controls each element of the digital photographing apparatus 100 according to the processed signal or an external input signal. The CPU/DSP 170 may reduce noise of input image data and perform image signal processes for image quality improvement such as gamma correction, color filter array interpolation, color matrix, color correction, color enhancement, and the like. Also, the CPU/DSP 170 may generate an image file by compressing the image data generated after image signal processing for image quality improvement or may restore image data from the image file. For example, a still image may be converted into a joint photographic experts group (JPEG) format or a JPEG 2000 format. Also, when a moving picture is recorded, a plurality of frames may be compressed and a moving picture file may be generated according to the moving picture experts group (MPEG) standard. An image file may be generated according to, for example, the exchangeable image file format (Exif) standard.

Image data output from the CPU/DSP 170 is input directly to the storage/reading controller 140 or to the storage/reading controller 140 through the memory 130, wherein the storage/reading controller 140 stores image data on the data storage unit 142 automatically or according to a signal from a user. Also, the storage/reading controller 140 reads data about an image from the image file stored in the data storage unit 142 and inputs the read data to the display driving unit 162 through the memory 130 or through another path so that an image may be displayed on the display unit 164. The data storage unit 142 may be detachable from or may be permanently attached to the digital photographing apparatus 100.

Also, in the CPU/DSP 170, noise removal process, color process, blurring process, edge enhancement, image analyzing, image recognition, and image effect process may be performed. As the image recognition, face recognition and scene recognition may be performed. In addition, in the CPU/DSP 170, a display image signal process for displaying on the display unit 164 may be performed. For example, brightness level adjusting, color correction, contrast adjusting, edge enhancement adjusting, screen division, characteristic image generating and synthesizing may be performed. The CPU/DSP 170 may be connected to an external monitor and may perform a predetermined image signal process to display on the external monitor. Also, the CPU/DSP 170 may transmit the processed image data and allow displaying the corresponding image on the external monitor.

In addition, the CPU/DSP 170 executes programs stored in the program storage unit 150 or includes a separate module to generate a control signal for controlling auto focusing, zoom changing, focus changing, and automatic exposure correction and provides the control signal to the iris driving unit 115, the lens driving unit 112, and the imaging device control unit 119 to control overall operation of elements included in the digital photographing apparatus 100, such as a shutter, flash, and the like.

The manipulation unit 180 may be used by a user to input a control signal. The manipulation unit 180 may include various buttons such as a shutter-release button, a power button, a zoom button, a mode selection button, and other photographing set adjusting buttons, wherein the shutter-release button inputs a shutter-release signal to expose the imaging device 118 to light for a predetermined time and to take a photograph, the power button inputs a control signal for controlling on/off of a power, and the zoom button expands or reduces an optic angle according to an input. The manipulation unit 180 may be realized in any form as long as a user may input a control signal, such as a button, a keyboard, a touch pad, a touch screen, a remote controller, and the like.

Figure 2:
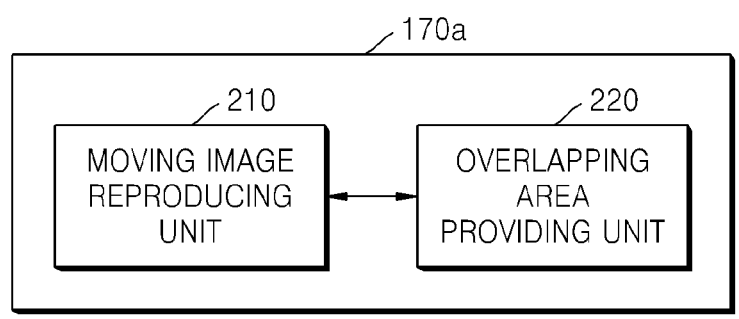
FIG. 2 is a block diagram showing a CPU/DSP according to an embodiment of the invention.

FIG. 2 is a block diagram showing a CPU/DSP 170a according to an embodiment of the invention.

The CPU/DSP 170a of the current embodiment includes a moving image reproducing unit 210 and an overlapping area providing unit 220.

The moving image reproducing unit 210 reproduces a moving image recorded in a moving image file. The moving image file may be stored in the data storage unit 142 (see FIG. 1) or the like, and the reproduced moving image may be displayed on the display unit 164 (see FIG. 1). The moving image reproducing unit 210 converts a signal that is decoded in accordance with specifications of the display unit 164 (see FIG. 1) and the display driving unit 162 (see FIG. 1) by decoding the moving image file and provides the converted signal.

The overlapping area providing unit 220 provides information regarding the moving image on an overlapping area during reproducing of the moving image. According to the current embodiment, the information may be a related still image captured during capturing of the moving image. According to another embodiment, the information may be geographical information recorded during capturing of the moving image, path information processed using the geographical information, or the like. According to another embodiment, the information may be a memo recorded during capturing of the moving image.

Figure 3:
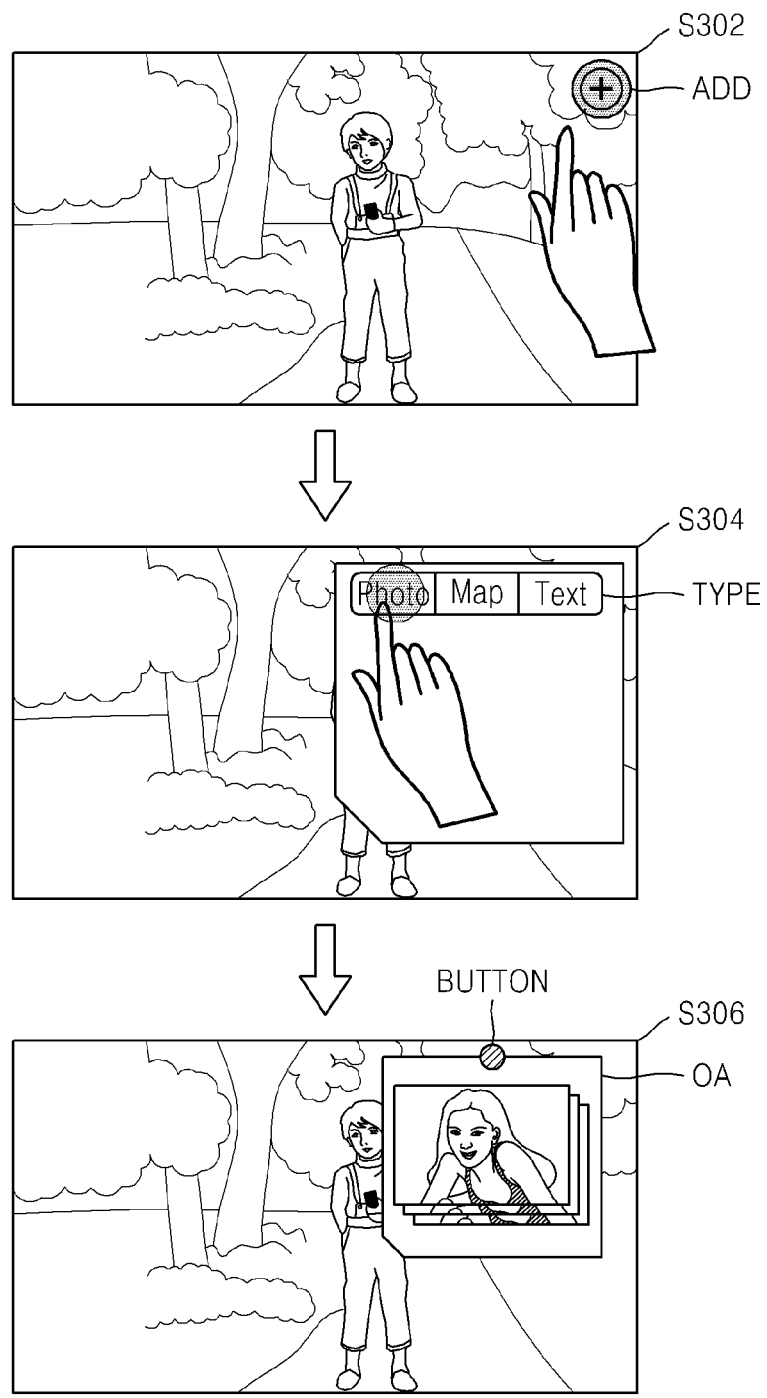
FIG. 3 are pictorial diagrams of an image reproducing screen according to an embodiment of the invention.

FIG. 3 contains images of an image reproducing screen according to an embodiment of the invention. Hereinafter, an operation of the overlapping area providing unit 220 is described with reference to FIG. 3.

According to the current embodiment, a user may select an overlapping area adding icon ADD to add an overlapping area OA during reproducing of a moving image (operation S302), and may select a type of related information to be provided to the overlapping area OA (operation S304). The overlapping area OA is displayed on a moving image reproducing screen by a user's input and related information is provided to the overlapping area OA (operation S306).

According to the current embodiment, when there are a plurality of types of related information regarding a moving image that is being reproduced, the types TYPE of the related information are provided to a user (operation S304), the user uses the types TYPE, and the related information having a type selected by the user is provided to the overlapping area OA (operation 306). Accordingly, the user may simply search and read information regarding the moving image that is being reproduced.

Figure 4:
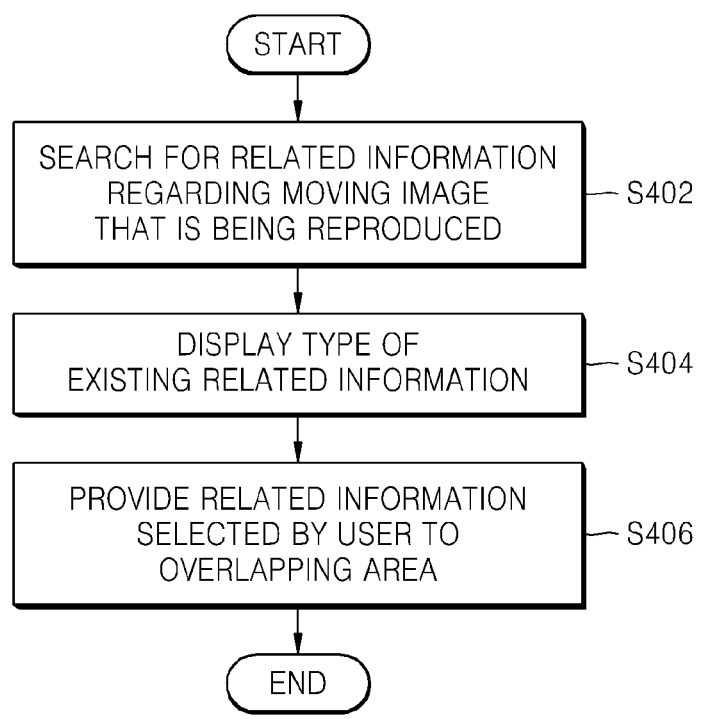
FIG. 4 is a flowchart showing a process of providing information regarding a moving image that is being reproduced, according to an embodiment of the invention.

FIG. 4 is a flowchart showing a process of providing information regarding a moving image that is being reproduced, according to an embodiment of the invention.

First, if a user selects the overlapping area adding icon ADD, related information regarding the moving image that is being reproduced is searched (operation S402).

According to the current embodiment, the related information may include an identifier indicating a moving image file related to the related information. For example, a related still image that is captured during capturing of the moving image may be stored as a separate still image file, and the still image file may include an identifier of the moving image file related to the related information. In this case, in order to search related information during reproducing of the moving image, a still image file having an identifier corresponding to the moving image file may be searched.

Furthermore, the moving image file may include an identifier indicating a related still image file related to the moving image. In this case, in order to search related information during reproducing of the moving image, an identifier of related information stored in the moving image file may be read, and related information corresponding to the stored identifier may be searched in the data storage unit 142.

According to another embodiment of the invention, the related information may be stored in the moving image file. For example, the moving image file may include a related still image captured during photographing of the corresponding moving image. Alternatively, the moving image file may include geographical information recorded during the photographing of the corresponding moving image, path information, memos, and the like. In this case, in order to search the related information, related information stored in the corresponding moving image file may be read.

Next, a type of the related information regarding the moving image is searched and then provided to a user (operation S404). As shown in operation S304 of FIG. 3, the type TYPE of the related information may be displayed on the moving image reproducing screen. If there are only a related still image and a memo as related information regarding the corresponding moving image and if there is no geographical information, only a still image mark PHOTO and a memo mark TEXT may be shown as the type TYPE of the related information, and a geographical information mark MAP may not be shown. Alternatively, if there are only a related still image and a memo as related information regarding the corresponding moving image and there is no geographical information, only a still image mark PHOTO and a memo mark TEXT may be highlighted as the type TYPE of the related information.

Next, if a user selects related information of a desired type in the type TYPE of the related information, the selected related information is provided to an overlapping area OA (operation S406). For example, if the user selects the still image mark PHOTO, the overlapping area OA is disposed on the moving image reproducing screen, and the related still image related to the moving image that is being reproduced may be displayed on the overlapping area OA.

Figure 5:
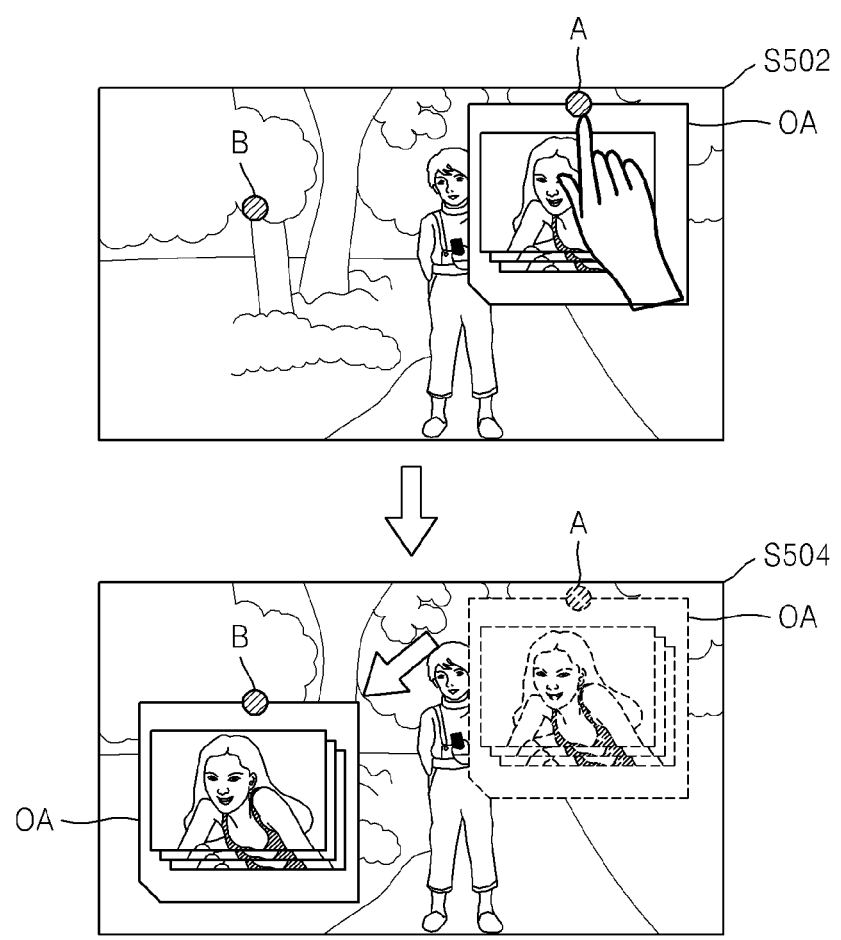
FIG. 5 are pictorial diagrams of an image reproducing screen according to an embodiment of the invention.

FIG. 5 contains images of an image reproducing screen according to an embodiment of the invention.

According to the current embodiment, a user may move an overlapping area OA on a moving image reproducing screen. As shown in FIG. 3, the digital photographing apparatus 100 may include an overlapping area moving button BUTTON. The user may move the overlapping area OA on the moving image reproducing screen by selecting and moving the overlapping area moving button BUTTON. For example, the user may touch the overlapping area OA (operation S502) to move the overlapping area OA from a point A to a point B (operation S504). Accordingly, the user may easily dispose related information to a desired position and may dispose the related information on the moving image reproducing screen, for example, by adding or moving a memo.

Figure 6:
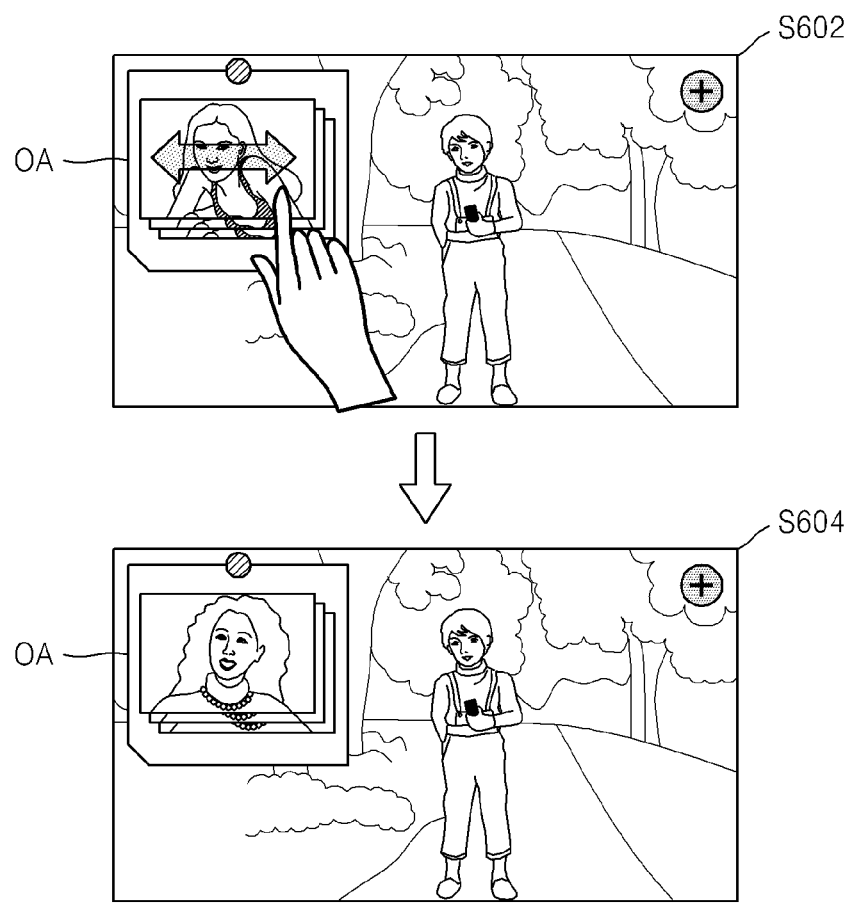
FIG. 6 are images of a related information displaying screen according to an embodiment of the invention.

FIG. 6 contains images of a related information displaying screen according to an embodiment of the invention.

According to the current embodiment, a user may manipulate related information displayed on an overlapping area OA. For example, when a related still image is displayed on the overlapping area OA, the user may select and change the related still image to be displayed through a touch input. For example, the user may turn over the related still image on the overlapping area OA through a touch input (operation S602) to change the related still image displayed on the overlapping area OA (operation S604).

Figure 7:
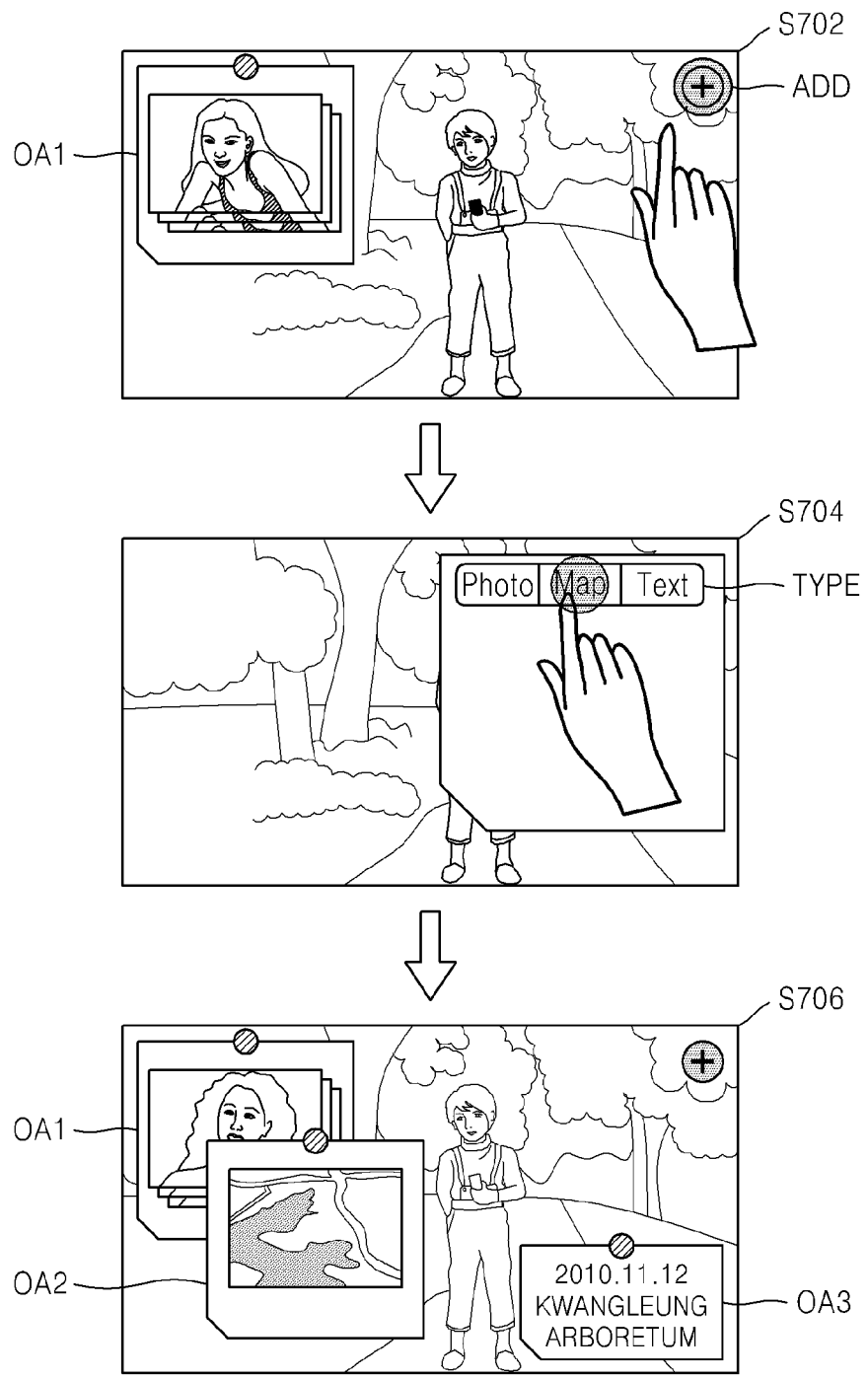
FIG. 7 are pictorial diagrams of a process of adding an overlapping area, according to an embodiment of the invention.

FIG. 7 contains images of a process of adding the overlapping area OA, according to an embodiment of the invention.

According to the current embodiment, a plurality of the overlapping areas OA may be disposed on the moving image reproducing screen. For example, as shown in FIG. 7, when a first overlapping area OA1 is disposed on the moving image reproducing screen (operation S702), if a user selects a different type of related information to add it (operation S704), a second overlapping area OA2 is added on the moving image reproducing screen (operation S706). According to the current embodiment, first to third overlapping areas OA1 to OA3 may be disposed on the moving image reproducing screen.

Also, according to the current embodiment, the user may select and remove any one of the first to third overlapping areas OA1 to OA3 disposed on the moving image reproducing screen.

Thus, the user may easily add or remove the related information regarding the moving image that is being reproduced.

Although FIGS. 3 to 5 and 7 show a touch input as a user's input, a key input may also or alternately be used as the user's input.

Figure 8:
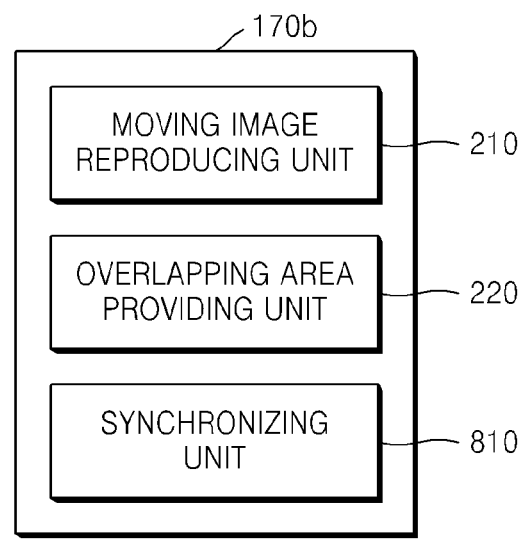
FIG. 8 is a block diagram showing a CPU/DSP according to another embodiment of the invention.

FIG. 8 is a block diagram showing a CPU/DSP 170*b* according to another embodiment of the invention.

The CPU/DSP 170*b* includes a moving image reproducing unit 210, an overlapping area providing unit 220, and a synchronizing unit 810.

The synchronizing unit 810 changes related information displayed on an overlapping area OA in conjunction with a reproducing time of a moving image that is being reproduced. For example, a related still image, geographical information, or a memo to be displayed on the overlapping area OA may be changed in conjunction with the reproducing time of the moving image.

Figure 9:
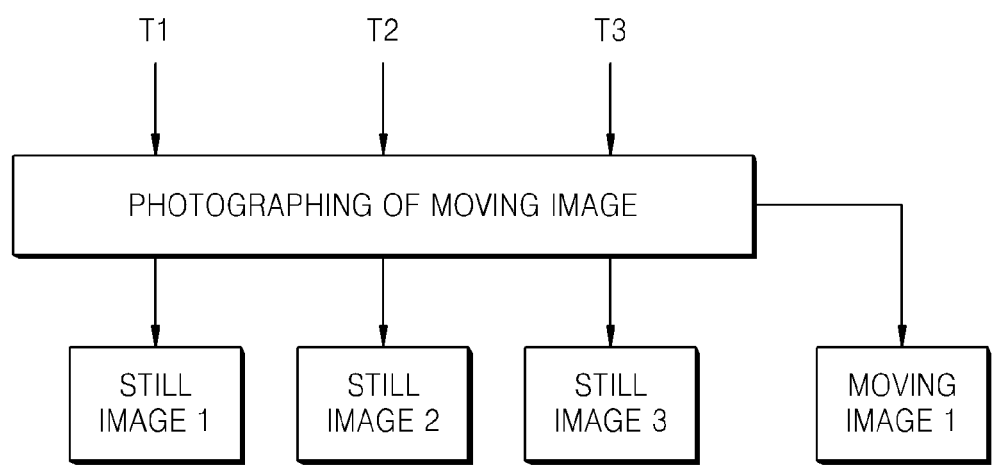
FIG. 9 is a block diagram for describing a related still image that is displayed on an overlapping area and is changed in conjunction with a moving image reproducing time, according to another embodiment of the invention.

FIG. 9 is a diagram for describing a related still image that is displayed on an overlapping area OA and is changed in conjunction with a moving image reproducing time, according to another embodiment of the invention.

According to the current embodiment, the related information may be related still images captured during capturing of a moving image. For example, as shown in FIG. 9, during capturing of a moving image 1, a still image 1 may be captured at a point in time T1, a still image 2 may be captured at a point in time T2, and a still image 3 may be captured at a point in time T3. According to the current embodiment, during reproducing of the moving image 1, if the related still image is provided to the overlapping area OA, the still image 1 may be displayed around the point in time T1, and the still image 2 may be displayed around the point in time T2, and the still image 3 may be displayed around the point in time T3. Accordingly, the user may easily see a still image related to the corresponding scene while reproducing the moving image.

Figure 10:
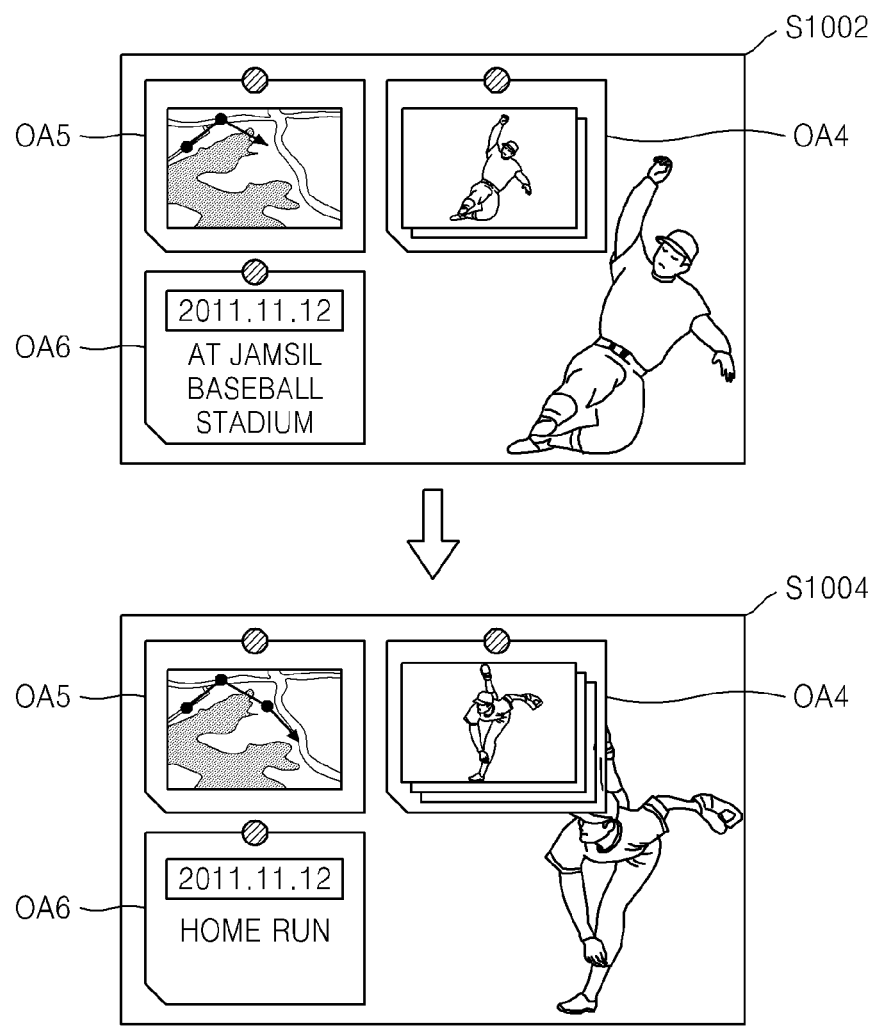
FIG. 10 are pictorial diagrams of a moving image reproducing screen according to another embodiment of the invention.

FIG. 10 contains images of a moving image reproducing screen according to another embodiment of the invention.

According to the current embodiment, related information displayed on at least one of a plurality of overlapping areas OA4 to OA6 on the moving image reproducing screen changes in conjunction with a reproducing time of a moving image. As shown in FIG. 10, related information of the overlapping areas OA4 to OA6 on a moving image reproducing screen S1002 at a first point in time is different from that of the overlapping areas OA4 to OA6 on a moving image reproducing screen S1004 at a second point in time. For example, a related still image displayed on the overlapping area OA4 may be changed according to the reproducing time of the moving image by the reproducing time of the moving image and a photographing time of the related still image that are in conjunction with each other. Also, geographical information displayed on the overlapping area OA5 may be changed according to the reproducing time of the moving image by using the geographical information in the related still image corresponding to the reproducing time of the moving image.

In addition, a memo displayed on the overlapping area OA6 may be changed according to the reproducing time of the moving image by the reproducing time of the moving image and a recording time of the memo that are in conjunction with each other.

The invention can also be embodied as computer-readable codes on a computer-readable storage medium. The computer-readable storage medium is any data storage device that can store data which can be thereafter read by a computer system.

The computer-readable codes are configured to execute operations of a method of reproducing an image, according to the invention, when the codes are read from the computer-readable storage medium and executed by a processor (for example, the CPU/DSP 170, 170a, or 170b). The computer-readable codes may be realized with various programming languages. Also, functional programs, codes, and code segments for accomplishing the invention can be easily construed by programmers skilled in the art to which the invention pertains. Examples of the computer-readable storage medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

The embodiments of the invention provide a method and apparatus for reproducing a moving image that may improve user convenience by providing information regarding the moving image to enable a user to conveniently and easily manipulate the apparatus.

Also, the embodiments of the invention provide a method and apparatus for reproducing a moving image that may dynamically provide information regarding a moving image in conjunction with a reproducing time of the moving image to effectively provide the information regarding the moving image to a user.

While the invention has been particularly shown and described with reference to exemplary embodiments thereof, it will be understood by those of ordinary skill in the art that various changes in form and details may be made therein without departing from the spirit and scope of the invention as defined by the following claims.

All references, including publications, patent applications, and patents, cited herein are hereby incorporated by reference to the same extent as if each reference were individually and specifically indicated as incorporated by reference and were set forth in its entirety herein.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. An image reproducing apparatus comprising:
    a moving image reproducing unit for reproducing a moving image and providing a reproducing time of the moving image; and
    an overlapping area providing unit for displaying related information regarding the moving image on one or more overlapping areas displayed on a moving image reproducing screen and providing a related information time or location of the related information,
    wherein:
        the one or more overlapping areas are movable and manipulable by a user's input; and
        the related information displayed in the overlapping area in conjunction with the reproducing time is changed according to a relationship between the reproducing time and the related information time or location.

2. The image reproducing apparatus of claim 1, wherein the overlapping area providing unit searches for the related information of a type designated by a user and provides the related information to the overlapping area.

3. The image reproducing apparatus of claim 1, wherein the related information is one or more related still images captured during capturing of the moving image, and a still image displayable on the overlapping area is selectable from among the one or more related still images according to a user's input.

4. The image reproducing apparatus of claim 1, wherein:
the related information is one or more related still images captured during capturing of the moving image; and
the related information time is a photographing time of each of the one or more related still images.

5. The image reproducing apparatus of claim 1, wherein:
the related information is geographical information recorded during capturing of the moving image; and
the related information location is a geographical information location of the geographical information.

6. The image reproducing apparatus of claim 1, wherein:
the related information is a memo recorded during capturing of the moving image; and
the related information time is a recording time of the memo.

7. The image reproducing apparatus of claim 1, further comprising:
displaying an additional overlapping area that is movable and manipulable by a user's input;
wherein:
related information displayed in the additional overlapping area is a different type of related information than that displayed in the overlapping area.

8. An image reproducing method comprising:
reproducing a moving image and a reproducing time of the moving image; and
displaying related information regarding the moving image on one or more overlapping areas displayed on a moving image reproducing screen and providing a related information time or location of the related information,
wherein:
the one or more overlapping areas are movable and manipulable by a user's input; and
the related information displayed in the overlapping area in conjunction with the reproducing time is changed according to a relationship between the reproducing time and the related information time or location.

9. The image reproducing method of claim 8, further comprising searching for the related information of a type designated by a user and providing the related information to the overlapping area.

10. The image reproducing method of claim 8, wherein the related information is one or more related still images captured during capturing of the moving image, and a still image displayable on the overlapping area is selectable from among the one or more related still images according to a user's input.

11. The image reproducing method of claim 8, wherein:
the related information is one or more related still images captured during capturing of the moving image; and
the related information time is a photographing time of each of the one or more related still images.

12. The image reproducing method of claim 8, wherein:
the related information is geographical information recorded during capturing of the moving image; and
the related information location is a geographical information location of the geographical information.

13. The image reproducing method of claim 8, wherein:
the related information is a memo recorded during capturing of the moving image; and
the related information time is a recording time of the memo.

14. A non-transitory computer-readable storage medium for storing a computer program code for executing an image reproducing method when being executed by a processor, the image reproducing method comprising:
reproducing a moving image and a reproducing time of the moving image; and
displaying related information regarding the moving image on one or more overlapping areas displayed on a moving image reproducing screen and providing a related information time or location of the related information,
wherein:
the one or more overlapping areas are movable and manipulable by a user's input; and
the related information displayed in the overlapping area in conjunction with the reproducing time is changed according to a relationship between the reproducing time and the related information time or location.

15. The computer-readable storage medium of claim 14, wherein the image reproducing method further comprises searching for the related information of a type designated by a user and providing the related information to the overlapping area.

16. The computer-readable storage medium of claim 14, wherein the related information is one or more related still images captured during capturing of the moving image, and a still image displayable on the overlapping area is selectable from among the one or more related still images according to a user's input.

17. The computer-readable storage medium of claim 14, wherein:
the related information is one or more related still images captured during capturing of the moving image; and
the related information time is a photographing time of each of the one or more related still images.

18. The computer-readable storage medium of claim 14, wherein:
the related information is geographical information recorded during capturing of the moving image; and
the related information location is a geographical information location of the geographical information.

19. The computer-readable storage medium of claim 14, wherein:
the related information is a memo recorded during capturing of the moving image; and
the related information time is a recording time of the memo.

* * * * *